(12) United States Patent
Whitehouse et al.

(10) Patent No.: US 10,700,514 B2
(45) Date of Patent: Jun. 30, 2020

(54) DC ELECTRICAL NETWORK

(71) Applicant: General Electric Technology GmbH, Baden (CH)

(72) Inventors: Robert Stephen Whitehouse, Stafford (GB); Carl David Barker, Stone (GB)

(73) Assignee: General Electric Technology GmbH, Baden (CH)

( * ) Notice: Subject to any disclaimer, the term of this patent is extended or adjusted under 35 U.S.C. 154(b) by 226 days.

(21) Appl. No.: 15/535,296

(22) PCT Filed: Dec. 10, 2015

(86) PCT No.: PCT/EP2015/079305
§ 371 (c)(1),
(2) Date: Jun. 12, 2017

(87) PCT Pub. No.: WO2016/092038
PCT Pub. Date: Jun. 16, 2016

(65) Prior Publication Data
US 2017/0331281 A1  Nov. 16, 2017

(30) Foreign Application Priority Data
Dec. 12, 2014 (EP) ..................................... 14275256

(51) Int. Cl.
*H02H 7/26* (2006.01)
*H02H 3/02* (2006.01)
*H02H 7/28* (2006.01)

(52) U.S. Cl.
CPC ............ *H02H 7/268* (2013.01); *H02H 3/021* (2013.01); *H02H 3/025* (2013.01); *H02H 7/28* (2013.01)

(58) Field of Classification Search
CPC ........ H02H 7/268; H02H 3/021; H02H 5/025; H02H 7/28

(Continued)

(56) References Cited

U.S. PATENT DOCUMENTS

| 2013/0193766 A1 | 8/2013 | Irwin et al. |
| 2014/0078799 A1 | 3/2014 | Erdman et al. |
| 2017/0133834 A1* | 5/2017 | Blug ...................... H02H 3/243 |

FOREIGN PATENT DOCUMENTS

| CN | 103503269 A | 1/2014 |
| EP | 2 670 013 A1 | 12/2013 |
| EP | 3 107 172 A1 | 12/2016 |

OTHER PUBLICATIONS

Barker, C.D., et al., "A current flow controller for use in HVDC grids," 10th IET International Conference on AC and DC Power Transmission, pp. 1-3 (2012) (Abstract).

(Continued)

*Primary Examiner* — Zeev V Kitov
(74) *Attorney, Agent, or Firm* — Eversheds Sutherland (US) LLP

(57) ABSTRACT

A DC electrical network comprising DC terminals operatively connectable to a converter; and DC transmission paths arranged to interconnect the DC terminals, and including a DC power transmission medium and a switching apparatus. The DC network further including: an active power electronic device connected in at the DC transmission paths, the active power electronic device; a detector configured to detect faults in the DC transmission paths; and a control unit programmed to operate the active power electronic device to vary an apparent impedance of a faulty DC transmission path to force a current flowing in the faulty DC transmission path to reduce to a target current level, and operate the switching apparatus to block current from flowing in the faulty DC transmission path when the current flowing in the faulty corresponding DC transmission path is reduced to the target current level.

10 Claims, 4 Drawing Sheets

(58) Field of Classification Search
USPC .......................................................... 361/93.1
See application file for complete search history.

(56) References Cited

OTHER PUBLICATIONS

Extended European Search Report and Opinion issued in connection with corresponding EP Application No. 14275256.7 dated Jun. 3, 2015.
International Search Report and Written Opinion issued in connection with corresponding PCT Application No. PCT/EP2015/079305 dated Mar. 23, 2016.
International Preliminary Report on Patentability issued in connection with corresponding PCT Application No. PCT/EP2015/079305 dated Jun. 13, 2017.
Machine Translation and First Office Action and Search issued in connection with corresponding CN Application No. 201580068703.0 dated Aug. 15, 2018.
Office Action issued in connection with corresponding EP Application No. 14275256.7 dated Oct. 31, 2018.

* cited by examiner

DC ELECTRICAL NETWORK

BACKGROUND TO THE INVENTION

This invention relates to a DC electrical network, and a method of fault clearance for a DC electrical network.

A DC electrical network may include a power source, such as a battery, that is connected to a load via one or more current-carrying conductors, or multiple power sources that are connected to multiple loads using a network of current-carrying conductors.

An example of a DC electrical network is a DC power grid that requires multi-terminal interconnection of HVDC converters, whereby power can be exchanged on the DC side using two or more HVDC converters electrically connected together. Each HVDC converter acts as either a source or sink to maintain the overall input-to-output power balance of the DC power grid whilst exchanging the power as required. The DC power grid relies on a network of DC power transmission lines or cables to achieve multi-terminal interconnection of the HVDC converters.

BRIEF DESCRIPTION OF THE INVENTION

According to a first aspect of the invention, there is provided a DC electrical network comprising: a plurality of DC terminals, each DC terminal being operatively connectable to a converter; and a plurality of DC transmission paths, each DC transmission path being arranged to interconnect two or more of the plurality of DC terminals, each DC transmission path including a DC power transmission medium, each DC transmission path further including a switching apparatus operable to selectively block current from flowing in the corresponding DC transmission path, the DC electrical network further including: at least one active power electronic device connected in at least one of the plurality of DC transmission paths, the or each active power electronic device being configured to be operable to selectively vary an apparent impedance of the or each corresponding DC transmission path; a detector configured to detect one or more faults occurring in the plurality of DC transmission paths; and a control unit programmed to operate the or each active power electronic device to vary an apparent impedance of a faulty corresponding DC transmission path so as to force a current flowing in the faulty corresponding DC transmission path to reduce to a target current level, the control unit being further programmed to operate the or each switching apparatus to block current from flowing in the faulty corresponding DC transmission path when the current flowing in the faulty corresponding DC transmission path is reduced to the target current level, wherein the target current level corresponds to a current threshold at or below which the switching apparatus can be operated to block current from flowing in the corresponding DC transmission path.

A DC power transmission medium may be any medium that is capable of transmitting electrical power between two or more electrical elements. Such a medium may be, but is not limited to, a submarine DC power transmission cable, an overhead DC power transmission line or cable and an underground DC power transmission cable.

In an embodiment, the DC circuit breakers are opened to interrupt the flow of current in a faulty DC transmission path after the fault is detected and its location is identified. Whilst the use of DC circuit breakers permits isolation of the faulty DC transmission path to allow the rest of the DC electrical network to continue its operation, presently available DC circuit breakers tend to be relatively large, bulky and expensive when compared to the or each active power electronic device forming part of the invention.

In an embodiment, the flow of power from one or more external sources into the DC electrical network is blocked either by operating the associated converter(s) to block the flow of power or by opening one or more circuit breakers connected between the external source(s) and converter(s). This allows the current in the faulty DC transmission path to be reduced to zero to permit disconnection of the faulty DC transmission path from the rest of the DC electrical network, and thereby allows the rest of the DC electrical network to be restored to normal service. However, before the faulty DC transmission path can be disconnected from the rest of the DC electrical network, it takes several hundred milliseconds for the direct current circulating in the DC electrical network to decay to a value sufficiently low to permit the disconnection to take place. The combination of the time required for the decay in the circulating direct current and the delays associated with opening and reclosing the circuit breaker(s) connected between the external source(s) and converter(s) could result in a significant period of loss of transmission capability in the DC electrical network. This in turn would have undesirable consequences on other electrical networks and their components connected to the DC electrical network.

In an embodiment, the DC electrical network is configured to permit a shift from a symmetric voltage of ±1 p.u. to an asymmetric voltage of 2 p.u. and 0 p.u., and to rely on control action of the converters to reduce a current flowing in a faulty DC transmission path to zero. Under these conditions faults between the DC electrical network and ground are considered to be high impedance faults and the current flowing into the fault is relatively small. Once the location of the fault is detected, control action of the converters can be then used to force the current in the faulty DC transmission path to zero, before mechanical switchgear, (e.g., AC circuit breakers), is operated to isolate the fault DC transmission path. Forcing the current to zero in this manner, however, requires the co-ordination of all the converters associated with the DC electrical network, thus requiring a complex and expensive communications system to enable performance of the coordination. In addition it can be difficult to implement such a communication system for certain topologies of the DC electrical network. Furthermore operation of the DC electrical network at twice the nominal voltage for a significant period of time would require all of its components and associated converters to be suitably rated to handle twice the nominal voltage, thus resulting in increased size, weight and costs of the DC electrical network.

The configuration of the DC electrical network in accordance with an embodiment provides a reliable means for clearing a fault in the DC electrical network that minimizes or obviates the need for any of the aforementioned alternatives, thus removing their associated disadvantages.

For the purposes of this specification, the term "active power electronic device" is intended to refer to a power electronic device that can be operated in a controlled manner as determined by a control unit.

The inclusion of at least one active power electronic device in the DC electrical network not only permits the use of relatively small and low-cost power electronic devices, but also permits the use of fast-acting power electronic devices to rapidly force the current flowing in the corresponding DC transmission path to reduce to the target current level, thus reducing the time delay in disconnecting the faulty DC transmission path from the rest of the DC electrical network.

In addition the configuration of the DC electrical network in an embodiment enables the operation of the or each active power electronic device to force the current flowing in the or each faulty DC transmission path to reduce to the target current level whilst minimally impacting the rest of the DC electrical network, thus permitting the rest of the DC electrical network to continue normal service without interruption.

Furthermore the configuration of the DC electrical network in an embodiment does not require all of its components and associated converters to be suitably rated to handle twice the nominal voltage.

Moreover the operation of the or each active power electronic device to force the current flowing in the or each corresponding DC transmission current path to the target current threshold may be carried out independently of the operation of the converters connected in use to the DC terminals. This removes the need for control action of the converters to force a current flowing in a faulty DC transmission path to reduce to the target current level.

In embodiments of the invention, the target current level may be zero or substantially zero. This permits the use of a switching apparatus that require a zero or substantially zero current to flow therethrough before it may be operated to block current from flowing in the corresponding DC transmission path. Such a switching apparatus may be, for example, a disconnector or isolator.

The or each active power electronic may be configured in different ways in order to enable the forcing of a current flowing in the faulty corresponding DC transmission path to reduce to the target current level.

In embodiments of the invention, the or each active power electronic device may be configured to be operable to selectively vary an apparent impedance of the or each corresponding DC transmission path and thereby direct current from at least one of the plurality of DC transmission paths to at least one other of the plurality of DC transmission paths, and the control unit is programmed to operate the or each active power electronic device to vary an apparent impedance of the or each corresponding DC transmission path and thereby divert current from at least one of the plurality of DC transmission paths to at least one other of the plurality of DC transmission paths so as to force a current flowing in the faulty corresponding DC transmission path to reduce to the target current level.

In embodiments of the invention, the or each active power electronic device may be configured to be operable to selectively inject a voltage drop in the or each corresponding DC transmission path and thereby vary an apparent impedance of the or each corresponding DC transmission path.

The DC electrical network may include a plurality of active power electronic devices. The control unit may be programmed to coordinate the operation of the plurality of active power electronic devices to vary an apparent impedance of the or each corresponding DC transmission path so as to force a current flowing in the faulty corresponding DC transmission path to reduce to the target current level. Such configuration of the control unit is useful when operation of a plurality of active power electronic devices is required to force a current flowing in the faulty corresponding DC transmission path to reduce to the target current level.

In embodiments of the invention, the or each active power electronic device may be a current flow controller that includes: a plurality of connecting points, each connecting point being connected in at least one of the DC transmission paths; and a current flow control unit interconnecting the plurality of connecting points, the current flow control unit including a plurality of interconnected current flow control sub-units each of which is, in use, connected in a respective DC transmission path, each current flow control sub-unit including at least one switching element, the or each switching element of each current flow control sub-unit being operable to selectively establish a current path through the current flow control unit between at least one DC transmission path and at least one other DC transmission path, and the or each switching element further being connected to at least one energy storage device to selectively provide a voltage source, wherein the control unit is or includes a switching control unit to control switching of each switching element of the current flow control unit to selectively establish the said current path through the current flow control unit and to selectively connect the or each energy storage device between the said at least one DC transmission path and the said at least one other DC transmission path in order to inject a voltage drop, in use, into at least one of the DC transmission paths and thereby direct current through the current path from the said at least one DC transmission path to the said at least one other DC transmission path so as to force the current in the faulty corresponding DC transmission path to reduce to the target current level.

In use, each DC transmission path may be connected to the current flow control unit via a single connecting point or multiple connecting points.

The inclusion of a voltage source in the current flow control unit permits injection of a voltage drop in at least one of the connected DC transmission paths. The injection of a voltage drop into a DC transmission path creates either a positive resistance effect in which the voltage drop opposes and thereby reduces the current flow in that DC transmission path, or a negative resistance effect in which the voltage drop contributes to an increase of the current flow in that DC transmission path. The application of a positive resistance effect in a DC transmission path allows the current in the said DC transmission path to be forced to reduce to the target current level, whilst the application of a negative resistance effect in a DC transmission path allows the current in the said DC transmission path to be increased through direction of current through the current path to the said DC transmission path from at least one other DC transmission path so as to force the current in the said at least one other DC transmission path to reduce to the target current level.

The inclusion of a plurality of current flow control sub-units in the current flow control unit permits independent control of each current flow control sub-unit to increase or decrease current flow in the corresponding DC transmission path, which in turn permits simplification of the control procedure of the current flow controller. This is particularly advantageous in an embodiment when the current flow controller is used in conjunction with a large number of DC transmission paths.

The current flow control unit may be used to direct current from a single DC transmission path to a single other DC transmission path, from a single DC transmission path to multiple other DC power transmission paths, from multiple DC transmission paths to a single other DC transmission path, or from multiple DC power transmission paths to multiple other DC transmission paths.

The current flow control unit may be a unidirectional current flow control unit that is able to direct current in one direction only between different DC transmission paths. Alternatively the current flow control unit may be a bidirectional current flow control unit that is able to direct current in both directions between different DC transmission paths.

The current flow control unit may be arranged to have different configurations, some examples of which are as follows.

The or each switching element may be connected to the same energy storage device to selectively provide a voltage source. Having all of the current flow control sub-units share the same single energy storage device provides considerable cost, weight and space savings in terms of the resulting current flow controller.

The voltage drop may be variable. The voltage drop may also be a positive or negative DC voltage drop.

The current flow control unit may include a plurality of switching elements, which may include, but is not limited to, a plurality of switching elements connected in series, a plurality of switching elements connected in parallel and/or a combination of series-connected and parallel-connected switching elements.

In embodiments of the invention at least one current flow control sub-unit may conduct current in two directions. This renders the current flow controller compatible for use in circumstances in which the direction of current between at least one DC transmission path and at least one other DC transmission path is required in either direction in order to force the current in the said at least one DC transmission path or the said at least one other DC transmission path to reduce to the target current level.

At least one current flow control sub-unit may include a plurality of switching elements connected in series.

At least one current flow control sub-unit may include a plurality of switching elements connected in parallel with the energy storage device in a full-bridge arrangement, in order to be able to provide a bidirectional voltage.

Each energy storage device may be, for example, a capacitor, a fuel cell, a battery or any other energy storage device capable of storing and releasing its electrical energy to provide a voltage.

Each switching element may be or may include a semiconductor device that is, for example, an insulated gate bipolar transistor, a gate turn-off thyristor, a field effect transistor, an insulated gate commutated thyristor, an injection-enhanced gate transistor, an integrated gate commutated thyristor, or any other self-commutated semiconductor device connected in series or in parallel.

In other embodiments the plurality of current flow control sub-units may include first and second current flow control sub-units, the first current flow control sub-unit includes a plurality of first switching elements connected in parallel with the energy storage device in a full-bridge arrangement, and the second current flow control sub-unit includes a plurality of second switching elements connected in parallel with the same energy storage device in a full-bridge arrangement.

According to a second aspect of the invention, there is provided a method of fault clearance for a DC electrical network, wherein the DC electrical network includes: a plurality of DC terminals, each DC terminal being operatively connectable to a converter; and a plurality of DC transmission paths, each DC transmission path being arranged to interconnect two or more of the plurality of DC terminals, each DC transmission path including a DC power transmission medium, each DC transmission path further including a switching apparatus operable to selectively block current from flowing in the corresponding DC transmission path, the DC electrical network further including at least one active power electronic device connected in at least one of the plurality of DC transmission paths, the or each active power electronic device being configured to be operable to selectively vary an apparent impedance of the or each corresponding DC transmission path, wherein the method comprises the steps of: detecting a fault occurring in one or more of the plurality of DC transmission paths; after detecting the fault occurring in one or more of the plurality of DC transmission paths, operating the or each active power electronic device to vary an apparent impedance of a faulty corresponding DC transmission path so as to force a current flowing in the faulty corresponding DC transmission path to reduce to a target current level; and operating the or each switching apparatus to block current from flowing in the faulty corresponding DC transmission path when the current flowing in the faulty corresponding DC transmission path is reduced to the target current level, wherein the target current level corresponds to a current threshold at or below which the switching apparatus may be operated to block current from flowing in the corresponding DC transmission path.

It will be understood that the features of the DC electrical network according to the first aspect of the invention applies mutatis mutandis to the method of fault clearance for a DC electrical network according to the second aspect of the invention. It follows that the corresponding advantages described above with reference to the first aspect of the invention applies mutatis mutandis to the second aspect of the invention.

BRIEF DESCRIPTION OF THE DRAWINGS

An embodiment of the invention will now be described, by way of a non-limiting example, with reference to the accompanying drawings in which.

DETAILED DESCRIPTION OF THE INVENTION

Figure 1:
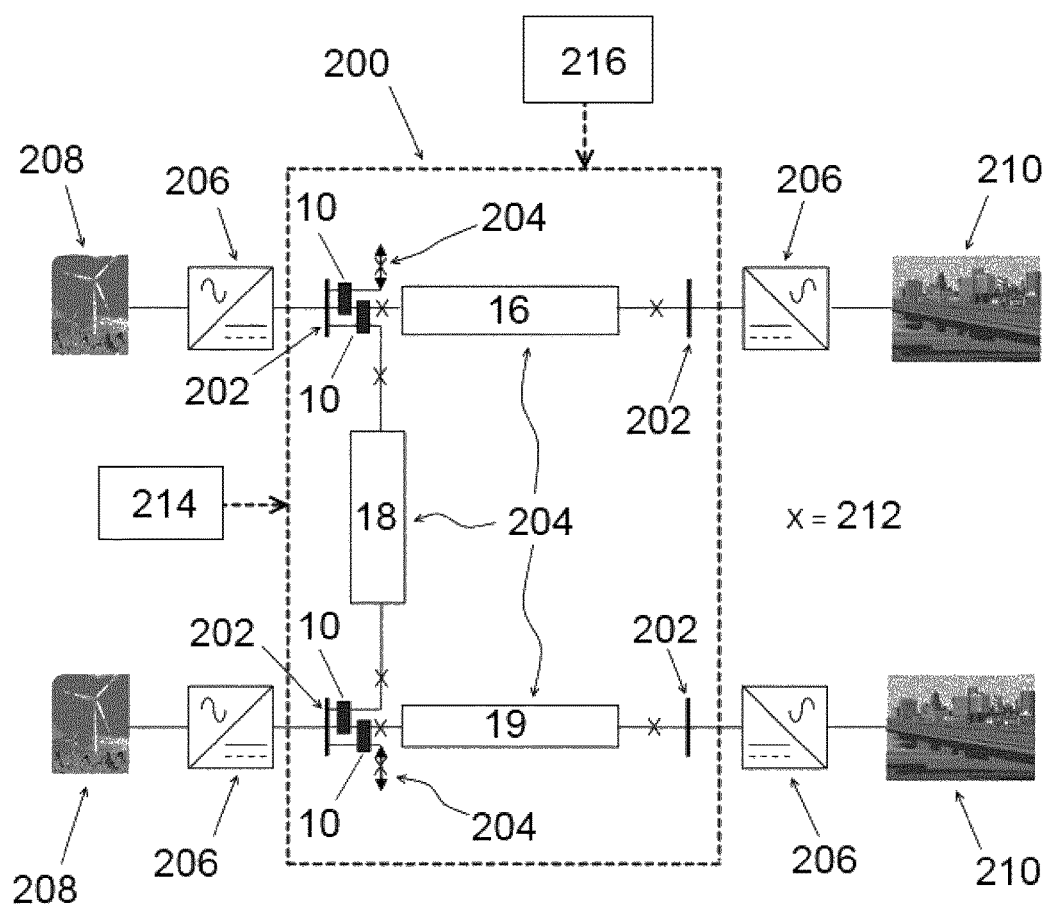
FIG. 1 shows schematically a DC power grid.

A DC power grid according to an embodiment of the invention is shown in FIG. 1 and is designated generally by the reference numeral 200.

The DC power grid 200 comprises a plurality of DC terminals 202, and a plurality of DC transmission paths 204. In use, each DC terminal 202 is operatively connected to the DC side of a respective AC-DC converter 206, which in turn is connected to a respective AC electrical network 208, 210.

In the embodiment shown in FIG. 1, a first DC transmission path 204 is arranged to interconnect a first DC terminal 202 and a second DC terminal 202, a second DC transmission path 204 is arranged to interconnect the first DC terminal 202 and a third DC terminal 202, and a third DC transmission path 204 is arranged to interconnect the third DC terminal 202 and a fourth DC terminal 202. FIG. 1 shows further DC transmission paths 204 that are connected to the rest of the DC power grid 200.

Each DC transmission path 204 includes a DC power transmission line 16,18,19. More particularly, the first DC transmission path 204 includes a first DC power transmission line 16, the second DC transmission path 204 includes a second DC power transmission line 18, the third DC transmission path 204 includes a third DC power transmission line 19, and each further DC transmission path 204 includes a respective further DC power transmission line (not shown).

Each DC transmission path 204 further includes a switching apparatus, which is in the form of a disconnector 212. In use, each switching apparatus can be operated to open to selectively block current from flowing in the corresponding DC transmission path 204 when the current flowing in the corresponding DC transmission path 204 is at a current threshold of zero or substantially zero.

Figure 2:
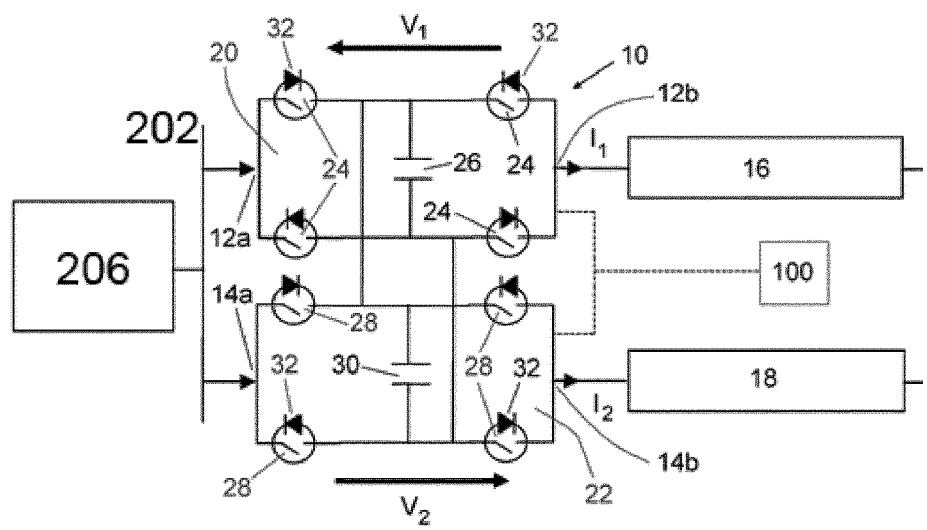
FIG. 2 shows schematically the structure of one type of current flow controller.

The DC power grid 200 further includes a plurality of active power electronic devices, each of which is connected in at least one of the plurality of DC transmission paths. Each active power electronic device is in the form of a current flow controller 10, the structure of which is shown in FIG. 2.

The following description of the current flow controller 10 is described with reference to the current flow controller 10 that is connected between the first and second DC power transmission lines 16, 18, but it will be understood that the following description applies mutatis mutandis to each of the other current flow controllers 10.

The current flow controller 10 comprises a plurality of connecting points, and a current flow control unit.

The plurality of connecting points defines a pair of first connecting points 12a, 12b and a pair of second connecting points 14a, 14b. In use, the pair of first connecting points 12a, 12b is connected in series with the first DC power transmission line 16, while the pair of second connecting points 14a, 14b is connected in series with the second DC power transmission line 18.

The current flow control unit includes first and second current flow control sub-units 20, 22. The first current flow control sub-unit 20 includes a plurality of first switching elements 24 connected in parallel with a first capacitor 26 in a full-bridge arrangement, and the second current flow control sub-unit 22 includes a plurality of second switching elements 28 connected in parallel with a second capacitor 30 in a full-bridge arrangement.

Each of the first and second switching elements 24, 28 is constituted by a semiconductor device in the form of an Insulated Gate Bipolar Transistor (IGBT). Each of the first and second switching elements 24, 28 also includes an anti-parallel diode 32 connected in parallel therewith.

In other arrangements (not shown), it is envisaged that one or more switching elements may be or may include a different semiconductor device such as a gate turn-off thyristor, a field effect transistor, an insulated gate commutated thyristor, an injection-enhanced gate transistor, an integrated gate commutated thyristor or any other self-commutated semiconductor device connected in series or in parallel.

It is also envisaged that, in other arrangements (not shown), each capacitor may be replaced by a different capacitor such as a fuel cell, a battery or any other capacitor capable of storing and releasing its electrical energy to provide a voltage.

The first current flow control sub-unit 20 is connected in series between the pair of first connecting points 12a,12b, while the second current flow control sub-unit 22 is connected in series between the pair of second connecting points 14a,14b. Thus, the first current flow control sub-unit 20 is connected in series with the first DC power transmission line 16, and the second current flow control sub-unit 22 is connected in series with the second DC power transmission line 18. The series-connection between each current flow control sub-unit 20, 22 and the corresponding DC power transmission line 16, 18 means that each current flow control sub-unit 20, 22 may have a voltage rating that is significantly lower than the voltage difference between the corresponding DC power transmission line 16, 18 and ground.

In use, the capacitors 26, 30 of each current flow control sub-unit 20, 22 is selectively bypassed or inserted into circuit with the corresponding DC power transmission line 16, 18 by changing the state of the corresponding switching elements 24, 28 of each current flow control sub-unit 20, 22.

In particular, the capacitors 26, 30 of each current flow control sub-unit 20, 22 is bypassed when the corresponding switching elements 24, 28 in each current flow control sub-unit 20, 22 are configured to form a short circuit in each current flow control sub-unit 20, 22. This causes the current $I_1$, $I_2$ in the corresponding DC power transmission line 16,18 to pass through the short circuit and bypass the capacitor, and so each current flow control sub-unit 20,22 injects a zero voltage drop $V_1$, $V_2$ across the corresponding pair of connecting points 12a,12b,14a,14b and in series with the corresponding DC power transmission line 16, 18.

In particular, the capacitors 26, 30 of each current flow control sub-unit 20, 22 is inserted into circuit with the corresponding DC power transmission line 16, 18 when the corresponding switching elements 24, 28 in each current flow control sub-unit 20, 22 are configured to allow the current $I_1$, $I_2$ in the corresponding DC power transmission line 16, 18 to flow into and out of the capacitor 26, 30. Each capacitors 26, 30 then charges or discharges its stored energy so as to provide a non-zero voltage drop $V_1$, $V_2$. Each capacitor 26, 30 may be inserted into circuit in either forward or reverse directions so as to inject a positive or negative voltage drop $V_1$, $V_2$ across the corresponding pair of connecting points 12a,12b,14a,14b and in series with the corresponding DC power transmission line 16, 18. The injection of the non-zero voltage drop $V_1$, $V_2$ in this manner allows the current flow controller 10 to selectively vary an apparent impedance of each of the first and second DC transmission paths 204.

In this manner each current flow control sub-unit 20, 22 is able to provide a bidirectional voltage drop across the corresponding pair of connecting points 12a,12b,14a,14b and conduct current in two directions, i.e. each current flow control sub-unit 20, 22 is able to operate in all four quadrants. Thus, the configuration of the switching elements 24, 28 and the capacitors 26, 30 in each current flow control sub-unit 20, 22 permits each current flow control sub-unit 20, 22 to selectively provide a voltage source.

The first and second capacitors 26, 30 are connected in parallel to electrically couple the first and second current flow control sub-units 20, 22 to permit transfer of energy, in use, between the first and second current flow control sub-units 20, 22. Hence, each switching element of the current flow control unit is operable to selectively establish a current path through the current flow control unit between the first and second DC power transmission lines 16, 18.

The DC power grid 200 further includes a detector 214 (e.g. a current sensor) configured to detect one or more faults in the plurality of DC transmission paths 204, and a control unit 216 to control opening and closing of each switching apparatus. The control unit 216 further includes a switching control unit 100 to control the switching of the switching elements 24, 28 of the first and second current flow control sub-units 20, 22.

It is envisaged that, in other embodiments of the invention, the functionality of the switching control unit 100 may instead be performed by a plurality of control components configured to perform different tasks (such as detection, location, operation and so on) associated with the switching of the switching elements 24, 28 of the first and second current flow control sub-units 20, 22. Such a plurality of components may be distributed about the DC power grid 200, optionally with the parts associated with the detection, location and operation functions being located at a respective load current controller.

During normal operation, the DC power grid 200 is used to transfer power, for example, from offshore wind farms 208 to on-shore AC systems 210 via the converters 206 and the DC transmission paths 204.

A fault or other abnormal operating condition may occur in the DC power grid 200. For example, one of the DC power transmission lines 16, 18, 19 of the DC power grid 200 may experience a pole-to-ground fault. The presence of the fault or other abnormal operating condition may result in a high fault current in the faulty DC power transmission line 16, 18, 19 and therefore in the DC power grid 200.

The current flow controller 10 may be operated to force a current in a faulty DC power transmission line 16, 18, 19 to reduce to a target current level that corresponds to the current threshold of zero or substantially zero at which the switching apparatus can be operated to block current from flowing in the corresponding DC transmission path 204. In this case the target current level is zero or substantially zero for a disconnector 212.

For the purposes of illustrating how an embodiment of the invention works, it is assumed that the first DC power transmission line 16 is the faulty DC power transmission line, but it will be understood that the following description of the working of an embodiment of the invention applies mutatis mutandis to a fault occurring in any of the other DC power transmission lines 18,19.

When the detector 214 detects the fault occurring in the faulty DC power transmission line 16, the switching control unit 100 controls switching of each switching element 24, 28 of the current flow control unit to selectively establish the current path through the current flow control unit between the first and second DC power transmission lines 16, 18 as follows.

To force the fault current $I_1$ in the first DC power transmission line 16 to reduce to the target current level, the switching control unit 100 switches the first switching element 24 of the first current flow control sub-unit 20 to inject a first non-zero voltage drop $V_1$ in series with the first DC power transmission line 16. The direction of the first non-zero voltage drop $V_1$ is set so that the application of the first non-zero voltage drop $V_1$ in series with the first DC power transmission line 16 creates a positive resistance effect in which the first non-zero voltage drop $V_1$ opposes and thereby reduces the current $I_1$ flowing in the first DC power transmission line 16. In this manner the apparent impedance of the first DC power transmission line 16 is varied to force the fault current $I_1$ flowing in the first DC transmission path 204 to reduce to the target current level.

At the same time, the switching control unit 100 switches the second switching element 28 of the second current flow control sub-unit 22 to inject a second non-zero voltage drop $V_2$ in series with the second DC power transmission line 18. The direction of the second non-zero voltage drop $V_2$ is set so that the application of the second non-zero voltage drop $V_2$ in series with the second DC power transmission line 18 creates a negative resistance effect in which the second non-zero voltage drop $V_2$ contributes to an increase of the current $I_2$ flowing in the second DC power transmission line 18.

Figure 3:
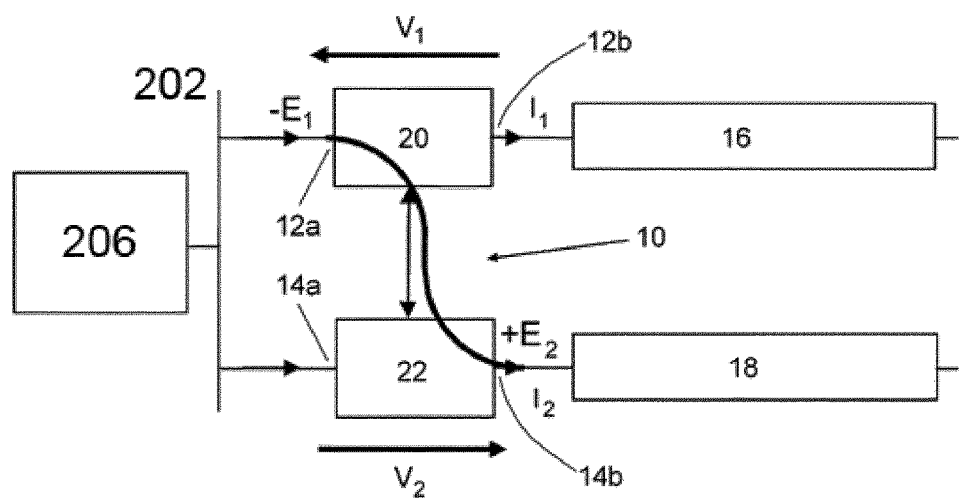
FIG. 3 illustrates the operation of the current flow controller of FIG. 2 to reduce a current in a faulty DC power transmission line to a target current level.

Meanwhile, as shown in FIG. 3, the application of the first and second non-zero voltage drops $V_1$, $V_2$ together with the electrical coupling between the first and second current flow control sub-units 20, 22 allows energy to be transferred between the DC power transmission lines 16, 18 via the current flow control unit. In this manner, energy $E_1$ is removed from the first DC power transmission line 16 that is undergoing a reduction in current $I_1$ and this energy $E_1$ is added to the second DC power transmission line 18 that is undergoing an increase in current $I_2$ by way of energy diversion through the current flow control unit. The energy $E_1$ diverted by the current flow control unit from the first DC power transmission line 16 is, in an embodiment, equal to the energy $E_2$ diverted by the current flow control unit into the second DC power transmission line 18 so as to minimizes dissipation losses during the diversion of energy by the current flow control unit.

In this manner the switching control unit 100 controls switching of each switching element 24, 28 of the current flow control unit to selectively establish the current path through the current flow control unit and to selectively connect each capacitor between the first and second DC power transmission lines 16,18 in order to inject a voltage drop $V_1$, $V_2$, in use, into each of the DC transmission paths 204 and thereby direct current through the current path from the first DC transmission path 16 to the second DC transmission path 18 so as to force the fault current $I_1$ in the faulty DC power transmission line 16 to reduce to the target current level.

When the fault current $I_1$ in the first DC power transmission line 16 is reduced to the target current level of zero or substantially zero, the control unit 216 operates the switching apparatus connected at both ends of the first DC transmission path 204 to open and thereby block current from flowing in the faulty first DC transmission path 204.

Meanwhile the rest of the DC power grid 200 is able to continue its normal service without interruption.

In the event that one current flow controller 10 is incapable of injecting a sufficiently high voltage drop in the first DC power transmission line 16 to reduce the fault current to the target current level, the switching control unit 100 may coordinate the operation of multiple current flow controllers 10 to vary the apparent impedance of the first DC transmission path 204 so as to force the fault current $I_1$ flowing in the first DC power transmission line 16 to reduce to the target current level. This is achieved by operating the multiple current flow controllers 10 to inject a respective voltage drop $V_1$ into the first DC transmission path 204 such that the combination of the injected voltage drop $V_1$ is sufficiently high to reduce the fault current $I_1$ in the first DC power transmission line 16 to the target current level.

The manner in which the current flow controller 10 is operated to force the fault current $I_1$ in the first DC power transmission line 16 to reduce to the target current level of zero or substantially zero by way of directing current away from the faulty DC power transmission line 16 means that it is only necessary for each current flow controller 10 to have information about the direction in which the fault lies, and not the exact location of the fault.

Figure 5:
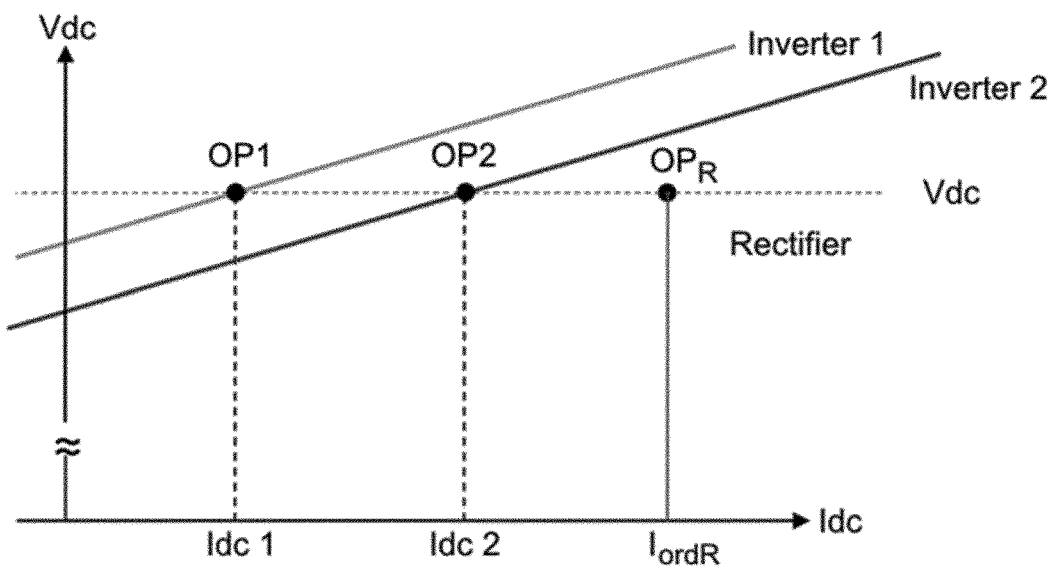
FIGS. 5 and 6 illustrate the application of the current flow controller of FIG. 2 to a three terminal meshed DC power grid.
Figure 6:
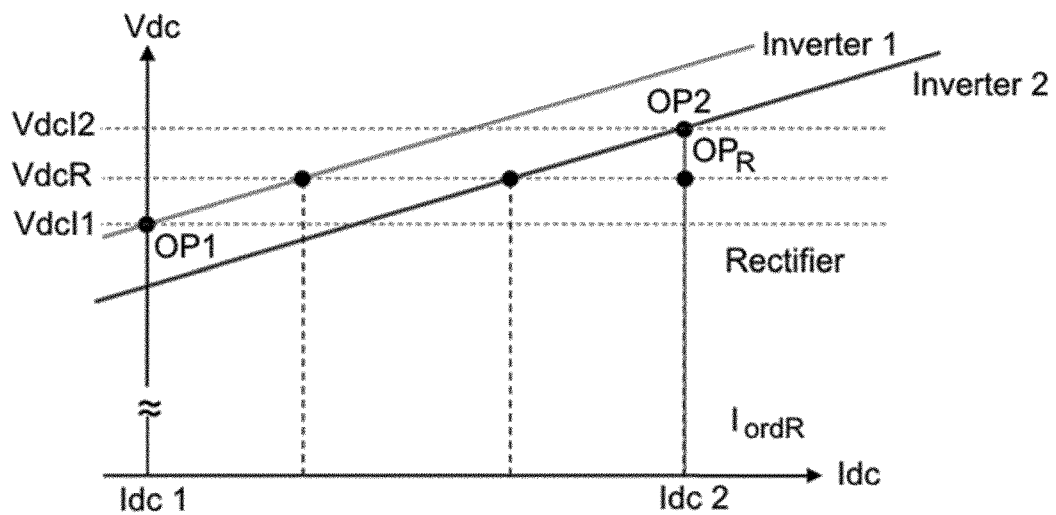

FIGS. 5 and 6 illustrate the application of the current flow controller of FIG. 2 to a three terminal meshed DC power grid.

The meshed DC power grid includes three DC terminals, each of which is connected to the other two DC terminals via a respective DC power transmission line. More specifically, a first DC power transmission line interconnects first and second DC terminals, a second DC power transmission line interconnects the first DC terminal and a third DC terminal, and a third DC power transmission line interconnects the second and third DC terminals. In this embodiment, the current flow controller 10 is connected between the first and second DC power transmission lines.

A first converter is in the form of a rectifier that interconnects the first DC terminal and an AC electrical power source, (e.g., an off-shore wind farm), and each of the second and third converters are in the form of inverters connected to a respective AC electrical network, (e.g., an AC power grid).

In this embodiment, the operating points OP1, OP2 of the second and third converters are determined in accordance with respective voltage drop control characteristics in order to maintain the DC grid voltage at a desired level, and the first converter is in constant voltage control. During normal operation, as shown in FIG. 5, each of the converters are operating at the same DC voltage $V_{dc}$, and so the currents $I_{dc\_1}, I_{dc\_2}$ flowing in the first and second DC power transmission lines are determined in accordance with the respective voltage drop characteristics. Meanwhile the current $I_{ordR}$ flowing in the first converter is the sum of the currents $I_{dc\_1}, I_{dc\_2}$ flowing in the first and second DC power transmission lines.

When a fault occurs in the first DC power transmission line, the current flow controller 10 is operated in the manner described above to respectively inject first and second non-zero voltage drops $V_1$, $V_2$ in series with the first and second DC power transmission lines. This creates a disparity in the respective DC voltages $V_{dc\_1}, V_{dc\_2}$ at the second and third converters.

Since the operating points OP1,OP2 of the second and third converters are determined in accordance with the respective voltage drop control characteristics, the disparity in the respective DC voltages $V_{dc\_1}, V_{dc\_2}$ at the second and third converters results in corresponding changes in the currents $I_{dc\_1}, I_{dc\_2}$ flowing in the first and second DC power transmission lines, as shown in FIG. 6. The changes in the currents $I_{dc\_1}, I_{dc\_2}$ flowing in the first and second DC power transmission lines occur by way of current being directed through the current path established through the current flow controller 10 from the first DC power transmission line to the second DC power transmission line. The operating voltage $V_{dcR}$ and current $I_{ordR}$ of the first converter remains unchanged, and so the total power flow from the first converter into the meshed DC power grid remains unchanged.

As shown in FIG. 6, the magnitude of the injected first and second non-zero voltage drops $V_1$, $V_2$ can be increased to suitable values so as to force a fault current in the faulty, first DC power transmission line 16 to reduce to the target current level, namely zero or substantially zero. At this stage a switching apparatus can be operated to disconnect the first DC power transmission line.

Figure 4:
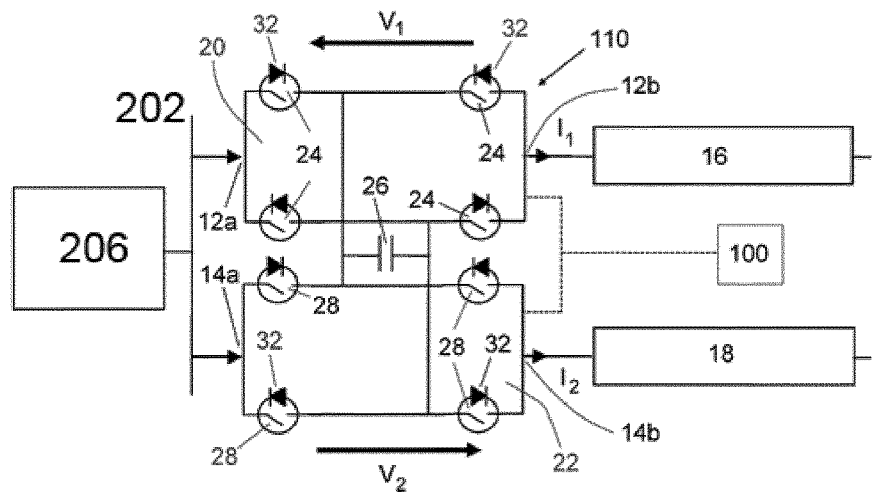
FIG. 4 shows schematically the structure of another type of current flow controller.

The current flow controller in FIG. 2 may be replaced by another current flow controller, as shown in FIG. 4, in which: the first current flow control sub-unit 20 includes a plurality of first switching elements 24 connected in parallel with a first capacitor 26 in a full-bridge arrangement; and the second current flow control sub-unit 22 includes a plurality of second switching elements 28 connected in parallel with the same first capacitor 26 in a full-bridge arrangement.

Thus, the first and second current flow control sub-units 20, 22 share the same first capacitor 26.

In use, the first capacitor 26 is selectively by-passed or inserted into a circuit with the respective DC power transmission line 16, 18 by changing the state of the corresponding switching elements 24, 28 of each current flow control sub-unit 20, 22.

The first capacitor 26 of the first current flow controller 10 is bypassed in a similar manner as the capacitors 26, 30 of each current flow control sub-unit 20, 22 of the aforementioned current flow controller 10, as described above.

The first capacitor 26 is inserted into a circuit with the respective DC power transmission line 16, 18 when the switching elements 24, 28 in each current flow control sub-unit 20, 22 are configured to allow the current $I_1, I_2$ in the corresponding DC power transmission line 16, 18 to flow into and out of the first capacitor 26. The first capacitor 26 then charges or discharges its stored energy so as to provide a non-zero voltage drop $V_1$, $V_2$. The first capacitor 26 may be inserted into a circuit with the respective DC power transmission line 16, 18 in either forward or reverse directions so as to inject a positive or negative voltage drop $V_1, V_2$ across the corresponding pair of terminals 12a,12b,14a,14b and in series with the respective DC power transmission line 16, 18.

Sharing the same first capacitor 26 results in the first and second current flow control sub-units 20, 22 being electrically coupled and thereby allows energy to be transferred between the first and second current flow control sub-units 20, 22.

It is envisaged that, in other embodiments, each DC power transmission line 16, 18, 19 may be replaced by, but is not limited to, a submarine DC power transmission cable, an overhead DC power transmission cable, an underground DC power transmission cable, or any DC power transmission medium of transmitting electrical power between two or more electrical elements.

It will be appreciated that the topology of the DC power grid 200 and current flow controllers 10 were merely chosen to illustrate the working of the invention and that the invention is applicable to other topologies of the DC power grid and active power electronic devices.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A DC electrical network comprising:
   a plurality of DC terminals, each being operatively connectable to a converter;
   a plurality of DC transmission paths, each DC transmission path being arranged to interconnect two or more of the plurality of DC terminals, each DC transmission path including a DC power transmission medium, and each DC transmission path further including a switching apparatus operable to selectively block current from flowing in a corresponding DC transmission path;

a plurality of active power electronic devices, the plurality of active power electronic devices being configured to selectively vary an apparent impedance of a corresponding DC transmission path by injecting a voltage drop in the corresponding DC transmission path;

a detector configured to detect one or more faults occurring in a first DC transmission path of the plurality of DC transmission paths; and a control unit programmed to coordinate, based on a determination that a first active power electronic device of the plurality of active power electronic devices is incapable of injecting a sufficiently high voltage drop in the first DC transmission path to reduce a fault current to a target current level, operation of a second active power electronic device of the plurality of active power electronic devices in conjunction with the first active power electronic device to inject a second voltage drop in the first DC transmission path, wherein a sum of the second voltage drop and a first voltage drop provided by the first active power electronic device is sufficient to force a fault current flowing in the first DC transmission path to reduce to a target current level, and wherein the control unit is further programmed to operate the switching apparatus to block current from flowing in the first DC transmission path when the current flowing in the first DC transmission path is reduced to the target current level, wherein the target current level corresponds to a current threshold at or below which the switching apparatus can be operated to block current from flowing in the corresponding DC transmission path.

2. A DC electrical network according to claim 1, wherein the target current level is zero or substantially zero.

3. A DC electrical network according to claim 1, wherein the switching apparatus is a disconnector or isolator.

4. A DC electrical network according to claim 1, wherein the active power electronic device is configured to be operable to selectively vary an apparent impedance of the corresponding DC transmission path and thereby direct current from at least one of the plurality of DC transmission paths to at least one other of the plurality of DC transmission paths, and the control unit is programmed to operate the active power electronic device to vary an apparent impedance of the first DC transmission path and thereby divert current from at least one of the plurality of DC transmission paths to at least one other of the plurality of DC transmission paths so as to force a current flowing in the first DC transmission path to reduce to the target current level.

5. A DC electrical network according to claim 1, wherein the active power electronic device is configured to be operable to selectively inject a voltage drop in the corresponding DC transmission path and thereby vary an apparent impedance of the corresponding DC transmission path.

6. A DC electrical network according to claim 1, wherein the active power electronic device is a current flow controller that comprises:

a plurality of connecting points, each connecting point being connected in at least one of the DC transmission paths; and a current flow controller interconnecting the plurality of connecting points, the current flow controller including a plurality of interconnected current flow control sub-units each of which is, in use, connected in a respective DC transmission path, each current flow control sub-unit including at least one switching element, the switching element of each current flow control sub-unit being operable to selectively establish a current path through the current flow controller between at least one DC transmission path and at least one other DC transmission path, and the switching element further being connected to at least one energy storage device to selectively provide a voltage source, wherein the control unit comprises a switching control unit to control switching of each switching element of the current flow controller to selectively establish the said current path through the current flow controller and to selectively connect the energy storage device between the said at least one DC transmission path and the said at least one other DC transmission path in order to inject a voltage drop, in use, into at least one of the DC transmission paths and thereby direct current through the current path from the said at least one DC transmission path to the said at least one other DC transmission path so as to force the current in the first DC transmission path to reduce to the target current level.

7. A method of fault clearance for a DC electrical network, wherein the DC electrical network includes:

a plurality of DC terminals, each DC terminal being operatively connectable to a converter; and a plurality of DC transmission paths, each DC transmission path being arranged to interconnect two or more of the plurality of DC terminals, each DC transmission path including a DC power transmission medium, each DC transmission path further including a switching apparatus operable to selectively block current from flowing in a corresponding DC transmission path, the DC electrical network further including a plurality of active power electronic device connected in at least one of the plurality of DC transmission paths, the plurality of active power electronic device being configured to be operable to selectively vary an apparent impedance of the corresponding DC transmission path, the method comprising:

detecting one or more faults occurring in a first DC transmission path of the plurality of DC transmission paths;

after detecting the fault occurring in one or more of the plurality of DC transmission paths, coordinating, based on a determination that a first active power electronic device of the plurality of active power electronic devices is incapable of injecting a sufficiently high voltage drop in the first DC transmission path to reduce a fault current to a target current level, operation of a second active power electronic device of the plurality of active power electronic devices in conjunction with the first active power electronic device to inject a second voltage drop in the first DC transmission path, wherein a sum of the second voltage drop and a first voltage drop provided by the first active power electronic device is sufficient to force a fault, current flowing in the first DC transmission path to reduce to a target current level; and operating the switching apparatus to block current from flowing in the first DC transmission path when the current flowing in the first DC transmission path is reduced to the target current level, wherein the target current level corresponds to a current threshold at or below which the switching apparatus can be operated to block current from flowing in the corresponding DC transmission path.

8. A DC electrical network according to claim 1, wherein the plurality of DC terminals comprises a meshed DC electrical network comprising three DC terminals.

9. A DC electrical network according to claim 8, wherein the converter interconnects a first DC terminal of the three DC terminals to an AC electrical power source, and wherein a second DC terminal and a third DC terminal of the three DC terminals connect to an AC electrical network.

10. A DC electrical network according to claim 9, wherein a first converter interconnecting the first DC terminal and the AC electrical power source is a rectifier, and wherein a second converter and a third converter in, the second DC terminal and third DC terminal are inverters.

* * * * *